(12) United States Patent
Millet et al.

(10) Patent No.: US 9,030,350 B2
(45) Date of Patent: May 12, 2015

(54) METHOD FOR INITIALIZING CARTESIAN TRACKS BASED ON BISTATIC MEASUREMENTS PERFORMED BY ONE OR MORE RECEIVERS OF A MULTISTATIC RADAR SYSTEM

(75) Inventors: Nicolas Millet, Villebon sur Yvette (FR); Sébastien Allam, Antony (FR); Mathieu Klein, Gif sur Yvette (FR); Thierry Malherbe, Limours (FR)

(73) Assignee: Thales, Neuilly sur Seine (FR)

( * ) Notice: Subject to any disclaimer, the term of this patent is extended or adjusted under 35 U.S.C. 154(b) by 271 days.

(21) Appl. No.: 13/601,828

(22) Filed: Aug. 31, 2012

(65) Prior Publication Data
US 2013/0099958 A1    Apr. 25, 2013

(30) Foreign Application Priority Data

Sep. 2, 2011    (FR) ...................................... 11 02670

(51) Int. Cl.
   G01S 13/72    (2006.01)
   G01S 13/00    (2006.01)
   G01S 13/66    (2006.01)
   G01S 13/87    (2006.01)

(52) U.S. Cl.
   CPC .............. *G01S 13/72* (2013.01); *G01S 13/003* (2013.01); *G01S 13/66* (2013.01); *G01S 13/878* (2013.01)

(58) Field of Classification Search
   CPC ....... G01S 13/003; G01S 13/66; G01S 13/72; G01S 13/878; G01S 13/726

USPC ..................................................... 342/90, 107
See application file for complete search history.

(56) References Cited

U.S. PATENT DOCUMENTS

2005/0285787 A1*  12/2005  Delaveau et al. ............. 342/387

FOREIGN PATENT DOCUMENTS

| EP | 2196821 | 6/2010 |
|---|---|---|
| FR | 2933775 | 1/2010 |
| WO | 2009047546 | 4/2009 |

OTHER PUBLICATIONS

French Search Report dated Apr. 2, 2012 in Application No. 1102670.

* cited by examiner

*Primary Examiner* — Timothy A Brainard
(74) *Attorney, Agent, or Firm* — Snell & Wilmer L.L.P.

(57) ABSTRACT

The invention consists of a method that makes it possible to produce an association of bistatic blips, formed by the different bistatic bases of a multistatic radar system comprising a plurality of transmitters and receivers remote from one another, this association making it possible to transmit to the tracking means only bistatic blips that probably correspond to one and the same target so as to facilitate the work of the tracking means. The association of blips that is produced takes into account the parameters defining, in three dimensions, the bistatic measurements (distance and speed), as well as the azimuth measurement, relating to the corresponding target.

17 Claims, 7 Drawing Sheets

METHOD FOR INITIALIZING CARTESIAN TRACKS BASED ON BISTATIC MEASUREMENTS PERFORMED BY ONE OR MORE RECEIVERS OF A MULTISTATIC RADAR SYSTEM

CROSS REFERENCE TO RELATED APPLICATION

This application claims priority to French Patent Application No. 1102670 entitled "METHOD FOR INITIALIZING CARTESIAN TRACKS BASED ON BISTATIC MEASUREMENTS PERFORMED BY ONE OR MORE RECEIVERS OF A MULTISTATIC RADAR SYSTEM," filed on Sep. 2, 2011, which is incorporated by reference herein in its entirety.

FIELD OF THE INVENTION

The invention relates to the general field of tracking in the context of multistatic radars. It relates more particularly to the multi-target tracking performed from passive multistatic systems.

BACKGROUND OF THE INVENTION

There are a certain number of difficulties in operating a passive radar system comprising a plurality of transmitters and/or receivers. In effect, each transmitter-receiver pair constitutes a bistatic base from which it is possible to perform, in different simple and known manners, the bistatic detection and tracking of objects moving in the space covered by that base.

However, when the aim is to know the overall aerial situation of the area covered by the radar system, it is necessary to jointly analyse the information delivered by the different bistatic bases, generally analysed in the form of individual tracks, so as to merge this information to construct global tracks or merged tracks.

A joint analysis of the information produced by the different bistatic bases consists in practice in forming and maintaining global Cartesian tracks by associating the detection information, the bistatic blips, produced by the different bistatic bases forming the detection system concerned, to form and maintain Cartesian tracks.

The French patent application document filed by the applicant on Jan. 9, 2009, under the number 0904144, describes a method that allows for such a joint analysis. This method is illustrated by FIG. 1. The method described makes it possible to form Cartesian tracks from bistatic blips produced by distinct bistatic bases, in the context of a detection system comprising a number of receivers, two bistatic bases then being able to be formed by the same receiver or by different receivers.

As FIG. 1 illustrates and as the text of the abovementioned patent application mentions, the formation and maintenance of these Cartesian tracks naturally involves one or more initialization steps. Various known methods can be used to perform the initialization of Cartesian tracks from bistatic blips produced by the different bistatic bases, formed from different receivers.

These methods are generally intimately linked, in respect of their principle, to the structure of the system concerned, and to the manner in which the bistatic blips produced by the different bistatic bases are associated.

However, whatever the method used, the initialization of Cartesian tracks comes up against the difficulty that is how to take into account a very large number of bistatic blips available at each instant to try to initialize tracks.

SUMMARY OF THE INVENTION

One aim of the invention is to propose a solution that makes it possible to initialize Cartesian tracks, a solution that is suited to the operation of a passive multistatic detection system comprising a number of receivers. In other words, one aim of the invention is to allow for an optimal analysis of the bistatic blips produced by the different bistatic bases forming the system, whether these blips are produced by bistatic bases formed by one and the same receiver or by bistatic bases formed by different receivers, to perform the initialization of Cartesian tracks. The expression "optimal analysis" should be understood to mean an analysis that makes it possible to avoid initializing a track from each bistatic blip formed.

To this end, the subject of the invention is a method for producing the association of bistatic blips corresponding to one and the same target detected by a multistatic radar system comprising a plurality of transmitters and receivers remote from one another, one pair (transmitter, receiver) forming a bistatic base of the system, each bistatic blip $P_i$ corresponding to the echo originating from the signal transmitted by a transmitter $Tx_j$ and received by a receiver $E_k$ and being characterized by the transmitter $Tx_j$ having transmitted the signal of which it is the echo. The bistatic blips formed being associated with the different transmitters of the system to form a set of pairs (blip, transmitter), the method according to the invention comprises:

a first module for forming triplets of pairs (Pi, $Tx_j$), these triplets combining pairs (blip, transmitter) which exhibit a distance and speed compatibility;

a second module for forming n-uplets of pairs (Pi, $Tx_j$), these n-uplets combining triplets formed in the preceding step satisfying given combination criteria which characterize the likelihood of the attribution of the different triplets to one and the same target;

The duly constituted n-uplets forming packets of blips which define one and the same target.

According to a particular implementation of the method according to the invention, the first step of forming triplets of pairs (blip, transmitter) is an iterative step which considers, on each iteration, three pairs (blip, transmitter), a first pair ($P_1$, $Tx_1$), a second pair ($P_2$, $Tx_2$) and a third pair ($P_{ref}$, $Tx_{ref}$) taken as a reference pair and which applies to them an association operation which tests the possibility of associating the first pair ($P_1$, $Tx_1$) and the second pair ($P_2$, $Tx_2$) to the reference pair ($P_{ref}$, $Tx_{ref}$), a pair (blip, transmitter) being able to be associated with the reference pair if the characteristics of the target corresponding to the blip considered are compatible with the characteristics of the target corresponding to the blip forming the reference pair; three pairs ($P_{ref}$, $Tx_{ref}$), ($P_1$, $Tx_1$) and ($P_2$, $Tx_2$), for which the association test is successful, forming a triplet of pairs.

According to a variant of this implementation, the first step of forming triplets of pairs (blip, transmitter) itself comprises the following operations:

a first association test to determine whether the pairs ($P_{ref}$, $Tx_{ref}$) and ($P_1$, $Tx_1$) can be associated;

a second association test to determine whether the pairs ($P_{ref}$, $Tx_{ref}$) and ($P_2$, $Tx_2$) can be associated;

a third test of compatibility of the pairs ($P_1$, $Tx_1$) and ($P_2$, $Tx_2$);

a fourth test of compatibilities of the bistatic distances of the blips;

a fifth test to test the likelihood of the Cartesian speed of the target corresponding to the associated blips;

a sixth operation of storage of the triplets formed from pairs ($P_1$, $Tx_1$) and ($P_2$, $Tx_2$) having successfully passed all the tests;

the association test implemented in the first test being identical to the one implemented in the second test.

According to a particular form of this variant implementation, the association test implemented in the first test consists, in the case where the selected blips $P_1$ and $P_{ref}$ originate from one and the same receiver Rx, in implementing the following four independent tests:

a first test (test 1) consisting in determining whether the bistatic speeds $Vb_k(P_1)$ and $Vb_k(P_{ref})$ of the blips $P_1$ and $P_{ref}$ can correspond to one and the same target speed, the first test being negative if the following is found:

$$|Vb_k(P_{ref}) - Vb_k(P_1)| > 2 \cdot V_{max}$$

where $V_{max}$ represents the maximum speed of the targets that are to be detected;

a second test (test 2) consisting in determining whether the values of the azimuths associated with the blips $P_1$ and $P_{ref}$ can correspond to one and the same target, given the accuracies $\sigma_{\theta k}(P_1)$ and $\sigma_{\theta k}(P_{ref})$ of the azimuth measurements performed; the second test being negative if the following is found:

$$|\theta_k(P_{ref}) - \theta_k(P_1)| > 3 \cdot \sqrt{\sigma_{\theta_k}^2(P_{ref}) + \sigma_{\theta_k}^2(P_1)};$$

a third test (test 3) consisting in determining whether the ellipsoids corresponding to the bistatic distances of the blips $P_1$ and $P_{ref}$ exhibit intersections, the third test being negative if the following is found:

$$(Db_k(P_{ref}) - Db_k(P_1))^2 - \|\vec{x}_{Txref} - \vec{x}_{Tx1}\|^2 > 0,$$

where $$\vec{x}_{Tx1} = [x_{Tx1} \quad y_{Tx1} \quad z_{Tx1}]^T \text{ and}$$

$$\vec{x}_{Txref} = [x_{Txref} \quad y_{Txref} \quad z_{Txref}]^T$$

here correspond respectively to the Cartesian position of the transmitter $Tx_1$ associated with $P_1$ and to the Cartesian position of the transmitter $Tx_{ref}$ associated with $P_{ref}$;

a fourth test (test 4) consisting in determining whether the intersections of the ellipsoids constructed from the bistatic distances characterizing the blips $P_1$ and $P_{ref}$ are compatible with the azimuth measurements relating to these blips, the fourth test being negative if the following is found:

$$[\cos\phi - 3\cdot\sigma_{\cos\phi}, \cos\phi + 3\cdot\sigma_{\cos\phi}] \cap [0,1] \approx \emptyset$$

where $\phi$ corresponds to the bearing according to which the potential target corresponding to the blips considered can be observed and $\sigma_{\cos\phi}$ the uncertainty affecting the determination of $\cos\phi$;

the association test being positive if the results of the four tests are positive.

According to a particular form of this particular form, the association test implemented in the second test consists, in the case where the selected blips $P_2$ and $P_{ref}$ originate from one and the same receiver Rx, in implementing, on the blips $P_2$ and $P_{ref}$, the four independent tests implemented in the first test.

According to another particular form of the variant implementation described previously, the association test implemented in the first test consists, in the case where the selected blips $P_1$ and $P_{ref}$ originate from distinct receivers $Rx_1$ and $Rx_{ref}$, in consecutively implementing the following four tests:

a first test (test A) consisting in determining whether it is possible to define, within the range limit of the detection system considered, an intersection of the directions of the azimuths of the observations corresponding to the blips $P_1$ and $P_{ref}$; and, if it is, in calculating this intersection, by taking into account the uncertainties of the measurements of the azimuths so that an area of intersection is defined;

a second test (test B) consisting, if the test A is positive, in determining whether the two spheres containing the ellipsoids defined by the bistatic distances of the blips $P_1$ and $P_{ref}$ exhibit an intersection;

a third test (test C) consisting, if the test B is positive, in determining whether the two ellipsoids defined by the bistatic distances of the blips $P_1$ and $P_{ref}$ exhibit an intersection;

a fourth test (test D) consisting, if the test C is positive, in determining whether the measurements of the bistatic distances associated with the blips $P_1$ and $P_{ref}$ are compatible with the area of intersection of the directions of the azimuths of the observations corresponding to the blips $P_1$ and $P_{ref}$ determined in the test A; the association test being positive if the results of the four tests are positive.

According to another particular form of this particular implementation, the association test implemented in the second test consists, in the case where the selected blips $P_2$ and $P_{ref}$ originate from distinct receivers $Rx_2$ and $Rx_{ref}$, in consecutively implementing, on the blips $P_2$ and $P_{ref}$, the four tests implemented in the first test (41).

According to another particular implementation, the third test (test C) is performed by the Lagrange multiplying method applied to the two ellipsoids considered.

According to another particular form of the variant implementation described previously, in the case where the blips $P_1$ and $P_2$ selected originate from one and the same receiver Rx, the third test of compatibility of the pairs ($P_1$, $Tx_1$) and ($P_2$, $Tx_2$) is performed by implementing, on the blips $P_1$ and $P_2$, tests similar to those implemented in the first test (41) in the case where the selected blips $P_1$ and $P_{ref}$ originate from one and the same receiver.

According to another particular form of the variant implementation described previously, in the case where the selected blips $P_1$ and $P_2$ originate from distinct receivers $Rx_1$ and $Rx_2$, the third test of compatibility of the pairs ($P_1$, $Tx_1$) and ($P_2$, $Tx_2$) is performed by implementing, on the blips $P_1$ and $P_2$, tests similar to those implemented in the first test in the case where the selected blips $P_1$ and $P_{ref}$ originate from distinct receivers.

According to a particular implementation of the method according to the invention, the second module for forming n-uplets of pairs (blip, transmitter) comprises the following steps:

a first step of forming n-uplets by analysing the validated triplets formed from one and the same reference pair ($P_{ref}$, $Tx_{ref}$), the analysis consisting in determining, by comparing all the triplets formed, the pairs ($P_i$, $Tx_j$) for which the following properties are verified for all the triplets simultaneously;

the blip $P_i$ is always associated with one and the same transmitter $Tx_j$, the transmitter $Tx_j$ is always associated with one and the same blip $P_i$; the pairs (blip, transmitter) verifying these two properties being associated in one and the same set called n-uplet a second step of filtering, applied to the n-uplets formed in the first step according to the number and the nature of the pairs $(P_i, Tx_j)$ contained in these n-uplets; the n-uplets formed comprising fewer than three pairs or the n-uplets not comprising the reference pair $(P_{ref}, Tx_{ref})$ being eliminated;

a third step, the object of which is, for each n-uplet not eliminated by the second step, to check the consistency of the n-uplet, the consistency check consisting in determining, by using the measurements of bistatic distance, of bistatic speed and of azimuth performed on the radar observations corresponding to the blips forming the n-uplet, whether the blips forming the pairs of the n-uplet correspond in a likely manner to one and the same target;

a fourth step consisting in storing the n-uplets having successfully undergone the preceding steps; the blips forming these n-uplets constituting packets or groups of blips intended for the initialization of Cartesian tracks.

According to a variant of this implementation, during the third step, the Cartesian position and the speed of the target corresponding to the blips forming the n-uplet are first calculated, then the Cartesian parameters of the duly determined target are transposed into bistatic parameters relating to the different bistatic bases having produced the blips considered, and then the duly determined bistatic parameters are compared to those of the blips considered.

Another subject of the invention is a method for initializing Cartesian tracks from bistatic blips corresponding to one and the same target detected by a multistatic radar system comprising a plurality of transmitters and receivers remote from one another, one pair (transmitter, receiver) forming a bistatic base of the system, each bistatic blip $P_i$ corresponding to the echo transmitted by a receiver $Tx_j$ and received, after reflection on a target, by a receiver $E_k$ and being characterized by the transmitter $Tx_j$ having transmitted the signal of which it is the echo. The method according to the invention comprises:

a preliminary step implementing the method of associating blips according to the invention, this step making it possible to determine an n-uplet of blips likely to correspond to one and the same track;

a track initialization step proper, consisting in determining, from the parameters of the blips forming the n-uplet considered, the parameters of the corresponding target.

According to a particular implementation of this method, the track initialization step comprises the following substeps:

a first substep during which a first rough estimation of the position of the target is made, this first estimation being performed by implementing the gradient algorithm;

a second substep during which an exhaustive intersection calculation is made making it possible to determine, from the measurements of the bistatic distances of the blips considered and from the accuracy of these distances, as well as the positions of the receiver and of the transmitters considered, the position of the target as well as an estimation of the covariance matrix associated with that position;

a third substep during which the speed of the target is calculated;

a fourth substep during which the initial covariance matrix C of the state of the target is estimated on the basis of the Cramer Rao limits determined from the accuracies of the bistatic distance, bistatic speed and azimuth measurements;

a fifth substep during which the new track is constructed by associating all the attributes which characterize it.

According to a particular implementation of this method, the latter also comprises a complementary step, prior to the preliminary step, consisting in performing a first two-dimensional association of the bistatic blips formed by the system, the analysis of the compatibility of the blips considered being performed by not taking account of the altitude of the observations corresponding to these blips, or the relative altitudes of the transmitters and of the receivers that make up the system; the bistatic blips associated during this complementary step being directly transmitted to the track initialization step, the preliminary step producing the three-dimensional association of only the blips not associated by the two-dimensional association step.

Also the subject of the invention is a method for initializing merged radar tracks, associating Cartesian tracks external to Cartesian tracks formed from the bistatic blips produced by a multistatic radar system comprising a plurality of transmitters and receivers remote from one another, one pair (transmitter, receiver) forming a bistatic base of the system, each bistatic blip $P_i$ corresponding to the echo transmitted by a receiver $Tx_j$ and received by a receiver $E_k$ and being characterized by the transmitter $Tx_j$ having transmitted the signal of which it is the echo. The method according to the invention associates the method for initializing Cartesian tracks according to the invention with a complementary association processing comprising two steps:

a first step which proceeds with the association of the external Cartesian tracks to construct merged external tracks whose attributes are functions of the attributes of external Cartesian tracks on which the merging is based;

a second step, the function of which is to try to associate free bistatic radar blips not yet associated to initialize radar Cartesian tracks, with external merged Cartesian tracks formed during the preceding step.

Such a method, although of general scope, is advantageously suited to the initialization of tracks in the context of the tracking method which is the subject of the French patent application 0904144 cited previously.

BRIEF DESCRIPTION OF THE DRAWINGS

The features and advantages of the invention will be better appreciated from the following description, which is based on the appended figures which represent.

MORE DETAILED DESCRIPTION

Figure 1:
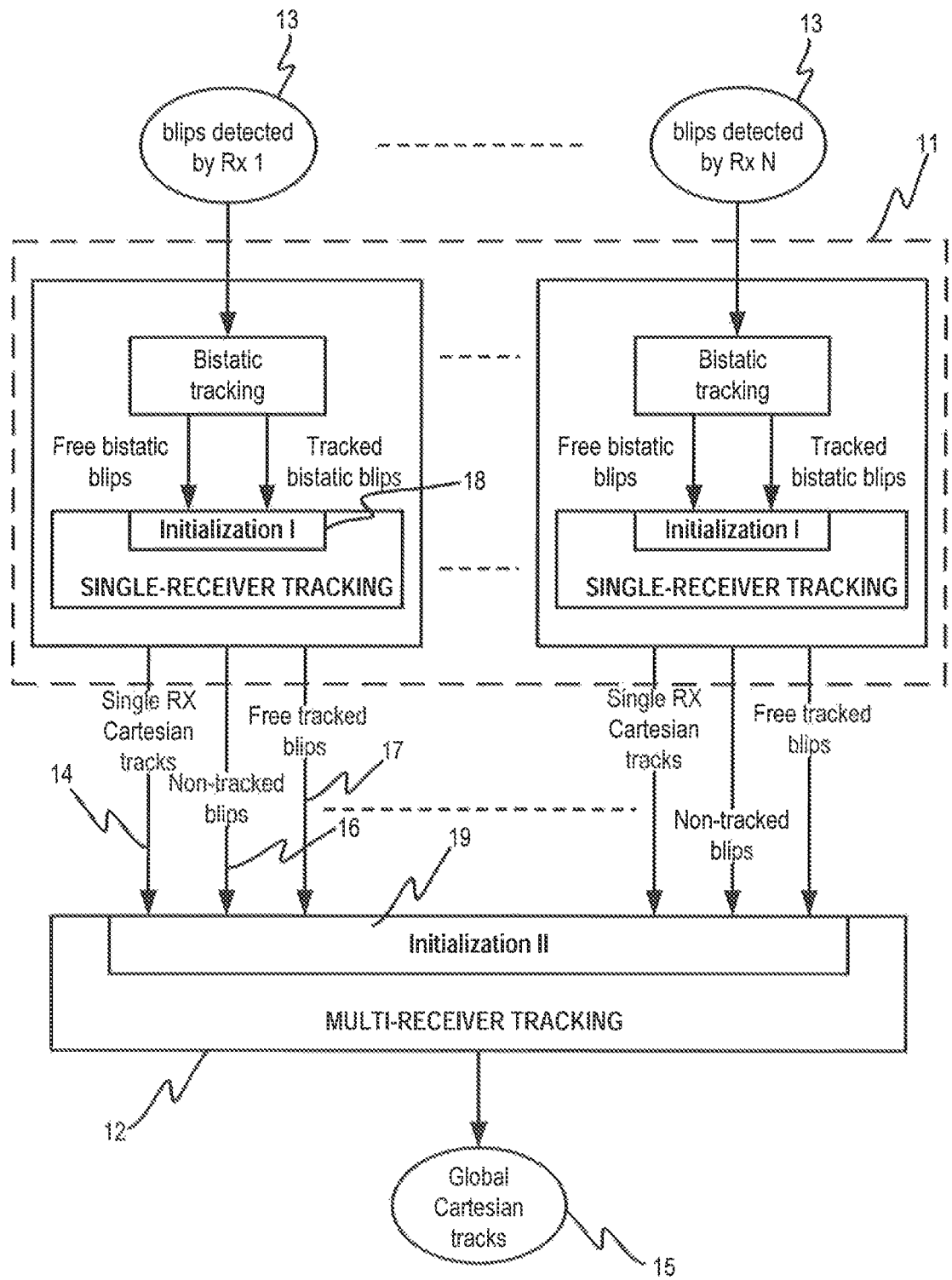
FIG. 1, the block diagram of an exemplary tracking method suited to a multi-receiver passive radar system.

FIG. 1 presents the block diagram of an exemplary tracking method suited to a passive radar system comprising a number of receivers, each receiver forming, with the opportunity transmitters present in the monitored area, different bistatic bases. Such a method naturally comprises one or more initialization modules making it possible to form tracks from individual detections, that is to say, formed bistatic blips.

It will be recalled here that a bistatic blip corresponds to a radar observation that has given rise to the detection of a possible target. This observation is associated with specific measurements such as, notably, bistatic distance, bistatic speed and azimuth measurements.

As FIG. 1 illustrates, the bistatic tracking method taken as an example comprises two information merging levels resulting in the formation and maintenance of Cartesian tracks.

The function of the first level 11 is to perform a merging of the detection information, of the bistatic blips 13, produced by the bistatic bases constructed from one and the same receiver and to form and maintain individual Cartesian tracks 14 from these bistatic blips.

The function of the second level 12 is to perform a merging of the detection information produced by all the bistatic bases, with all receivers considered. The merging processing operation that is performed consists mainly in forming and maintaining global Cartesian tracks 15 from individual Cartesian tracks 14 assumed to correspond to one and the same object seen by one and the same receiver, as well as from the bistatic blips that have remained free.

In practice, a global Cartesian track 15 is formed and maintained by using the blips of the associated individual Cartesian tracks 14 produced at the first level 11, as well as the bistatic blips 16 not used at the first level to form individual Cartesian tracks 14 (non-tracked blips) and the bistatic blips 17 corresponding to individual Cartesian tracks 14 not yet merged (free tracked blips).

Figure 2:
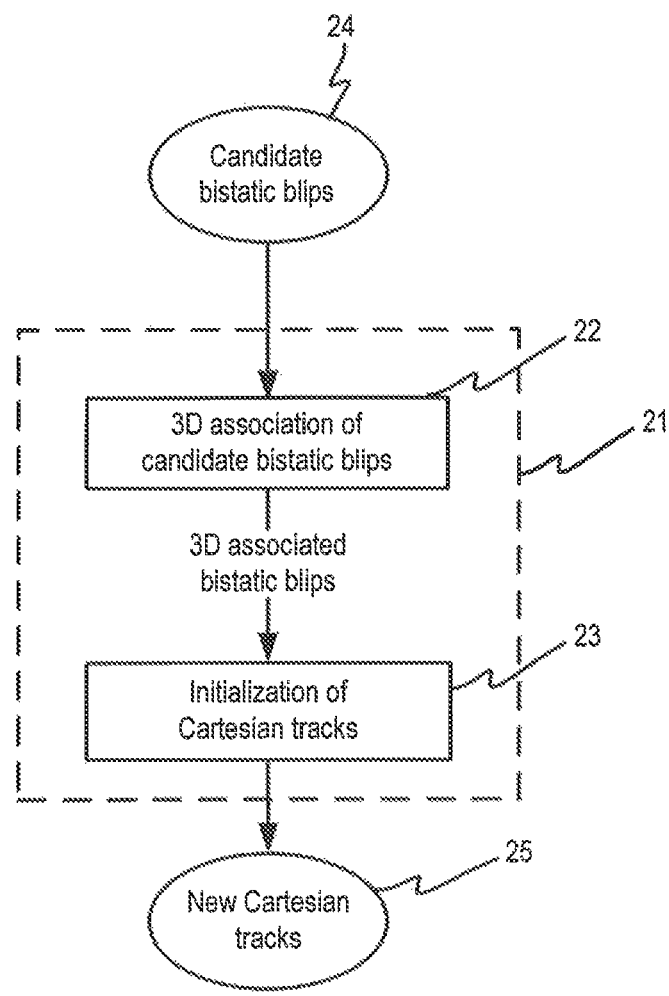
FIG. 2, the block diagram of a first exemplary module for initializing Cartesian tracks implementing the method for the 3D association (association in three dimensions) of bistatic blips according to the invention.
Figure 6:
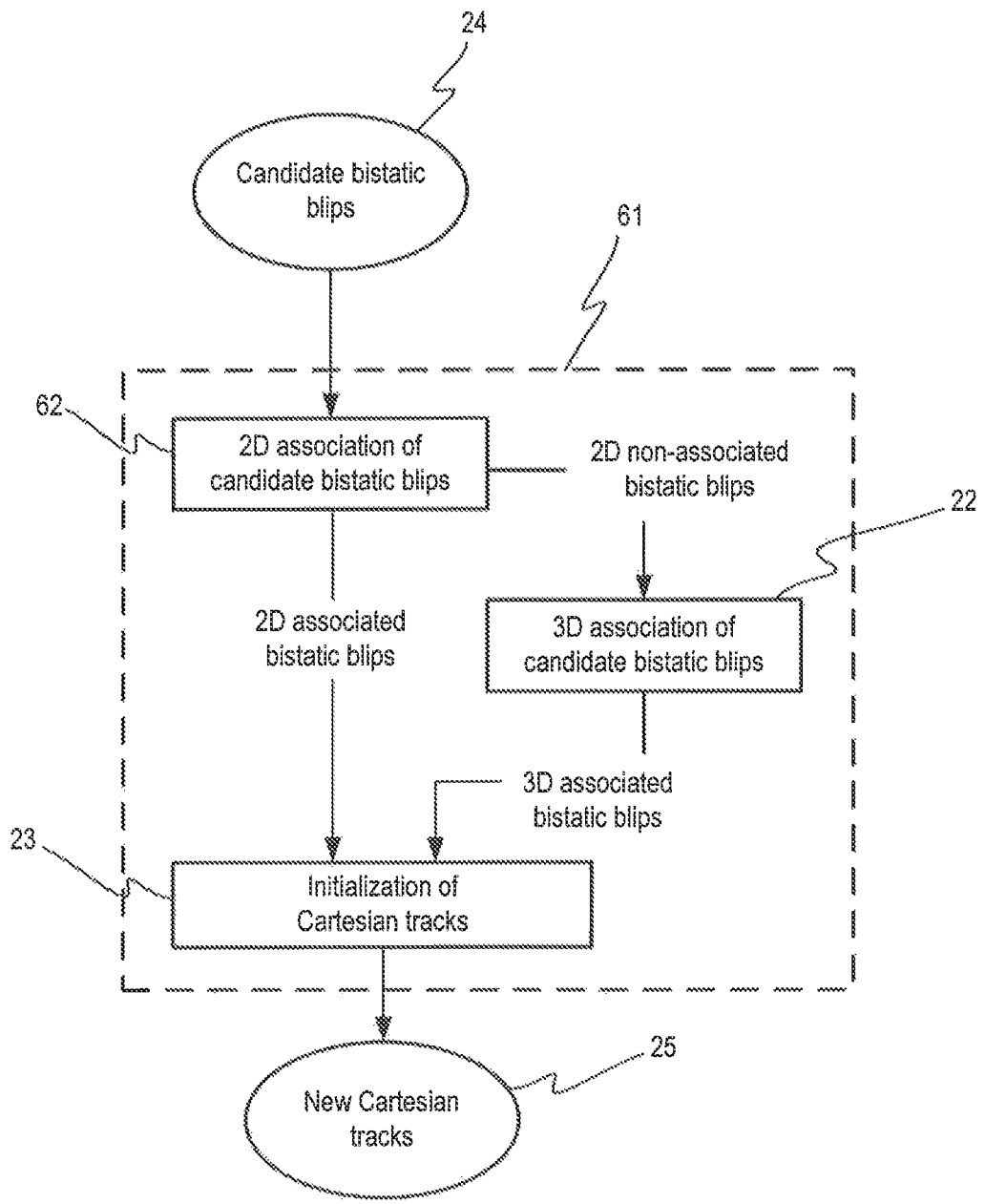
FIG. 6, the block diagram of a second exemplary initialization module implementing the method for the 3D association of bistatic blips according to the invention.

Moreover, as can be seen in FIG. 1, each level of merging, of formation and of maintenance of Cartesian tracks comprises an initialization module 18 or 19 which proceeds with the construction of new tracks, this module implementing a suitable initialization. FIGS. 2 and 6 present, by way of example, the block diagrams of two different initialization modules 21 and 61, which may correspond to the initialization modules 18 and 19, implementing the method 22 for the 3D association (association in three dimensions) of bistatic blips according to the invention, before proceeding with the actual initialization 23. The implementation of the method according to the invention advantageously makes it possible to limit the number of bistatic blips to be considered in the initialization.

Generally, as FIG. 2 illustrates, this method uses free bistatic blips 24 or candidate bistatic blips, that is to say blips not yet used and candidates to form new Cartesian tracks 25.

Depending on the cases, that is to say depending on whether it is a single-receiver system (or the single-receiver tracking step 18) or multi-receiver system (or the multi-receiver tracking step 19) that is being considered, the Cartesian tracks formed are called "individual Cartesian tracks" (the tracks 14 of the tracking of FIG. 1 for example) or "merged Cartesian tracks" (the tracks 15 of the tracking of FIG. 1 for example).

Figure 3:
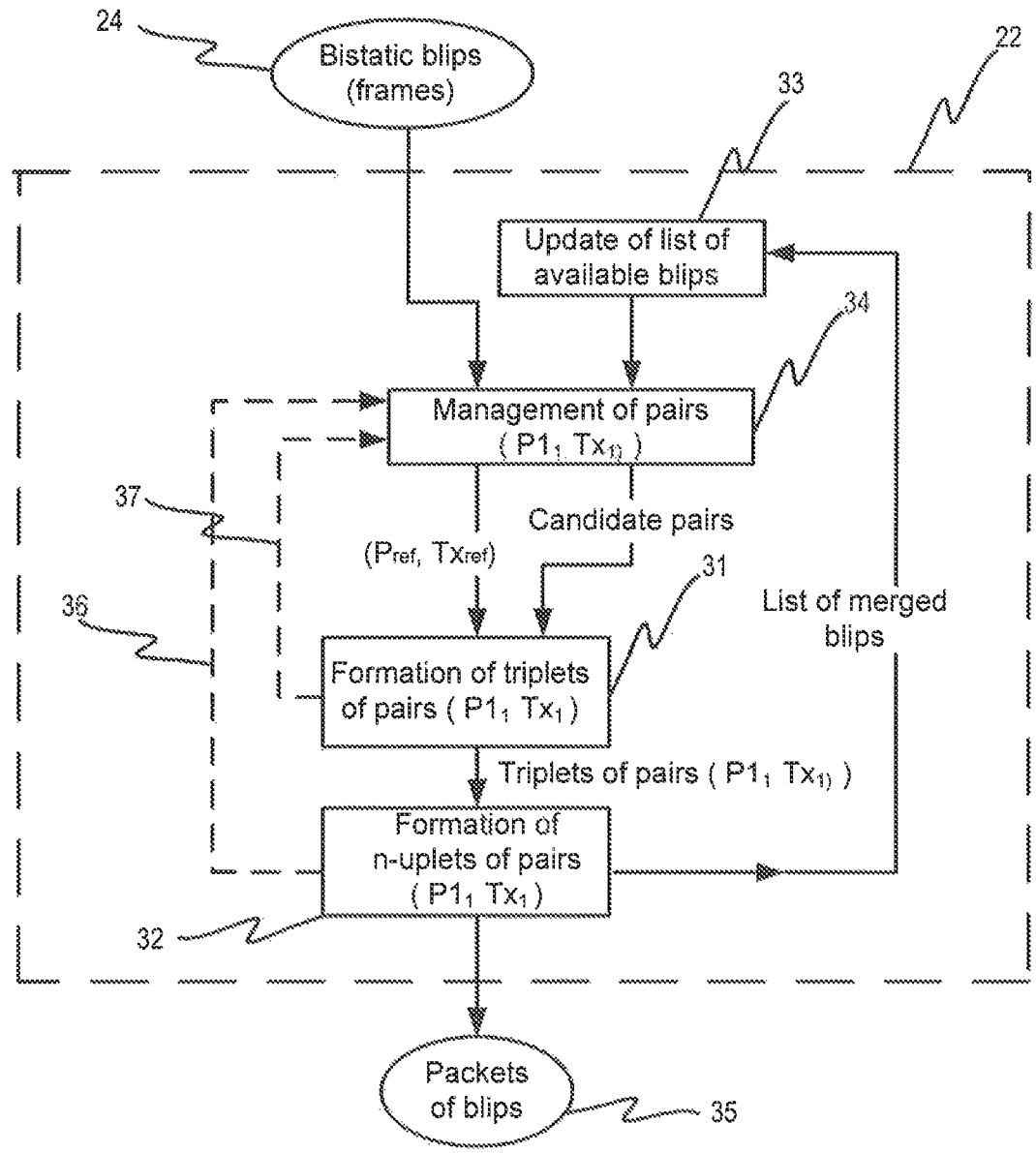
FIG. 3, the block diagram of the method for the 3D association of bistatic blips according to the invention.
Figure 4:
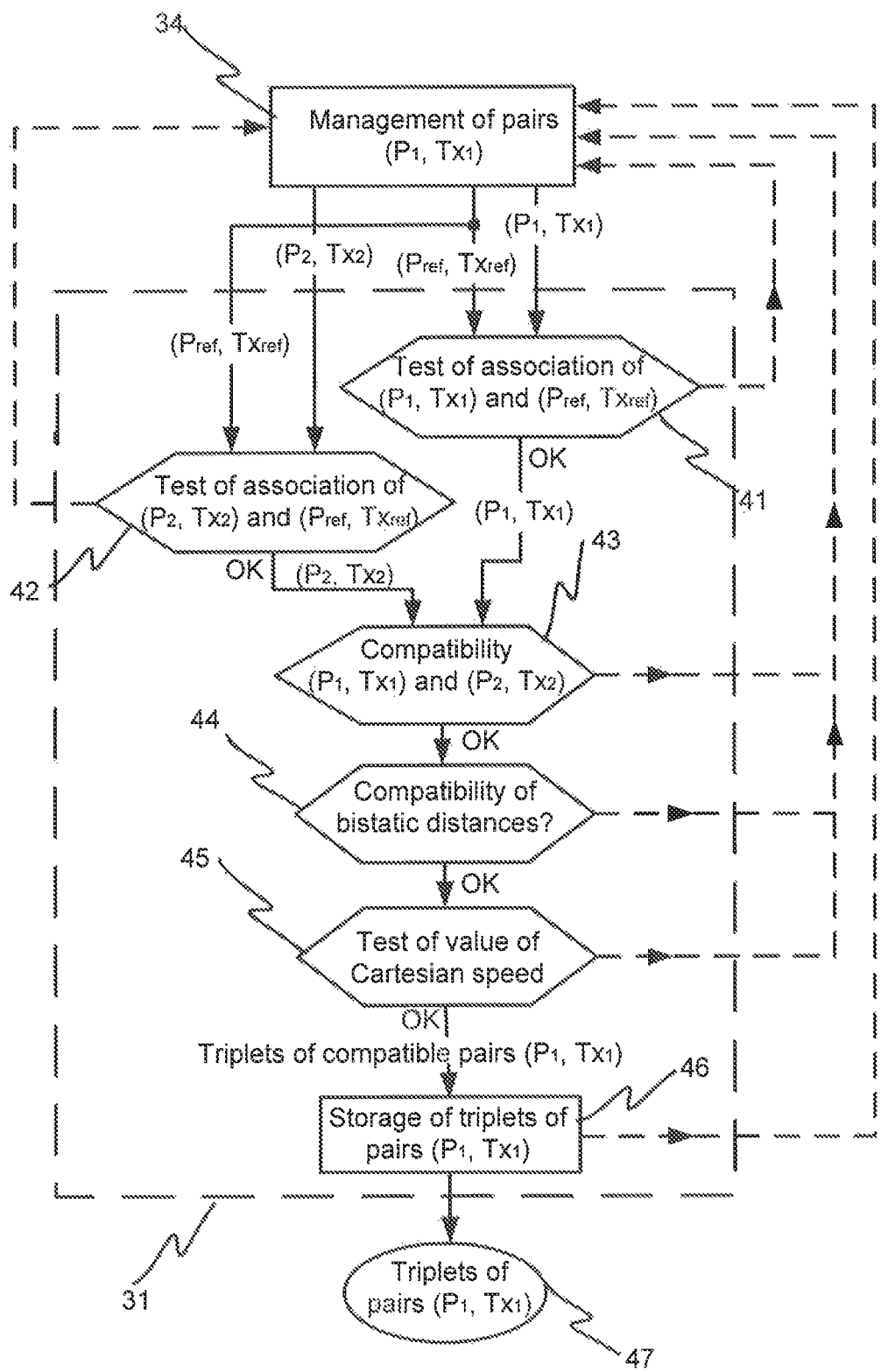
FIG. 4, the block diagram of the module for forming triplets of compatible pairs (blip, transmitter), of the method for the 3D association of bistatic blips according to the invention.
Figure 5:
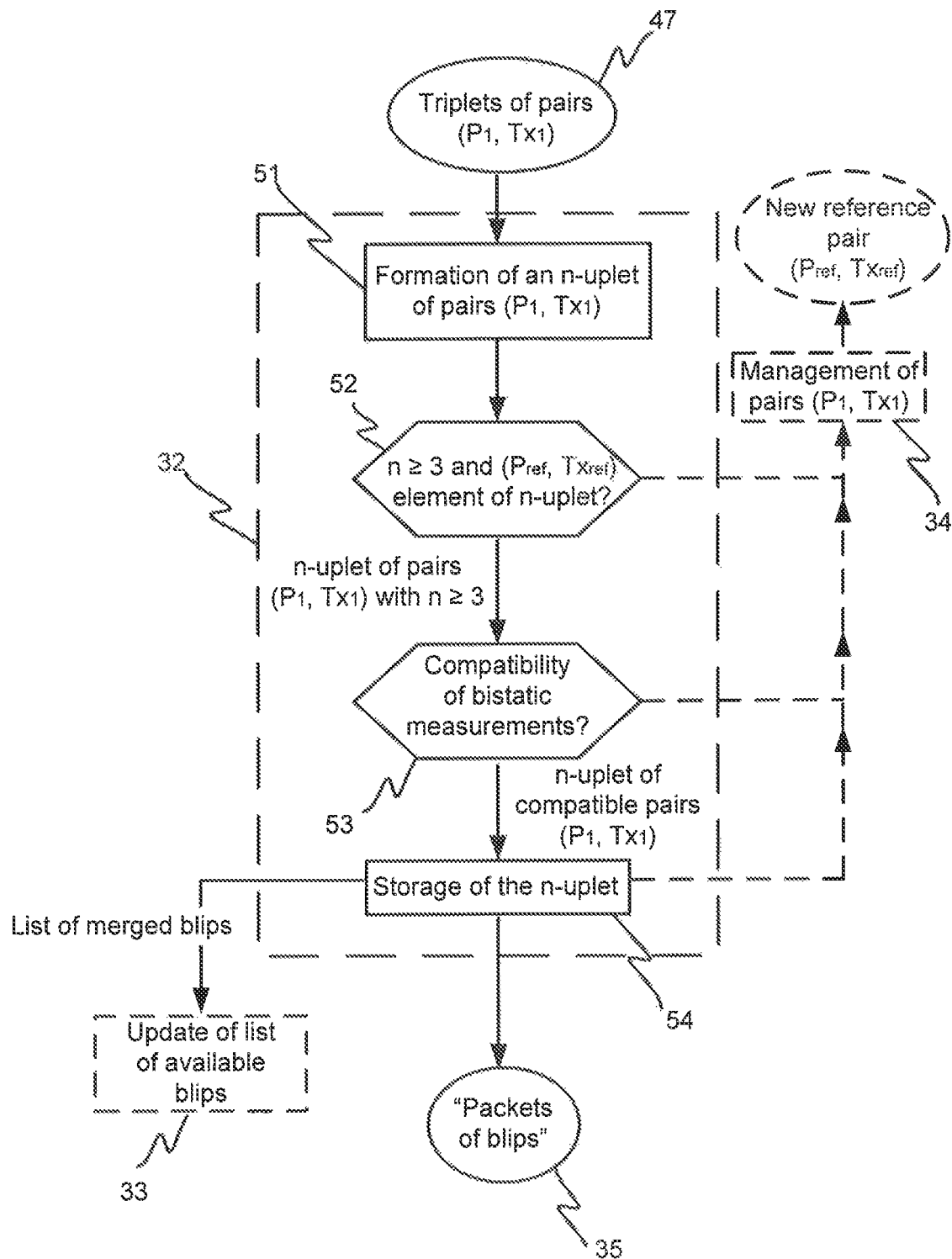
FIG. 5, the theoretical block diagram of the module for forming n-uplets of the method for the 3D association of bistatic blips according to the invention.

The method for the 3D association of bistatic blips according to the invention is illustrated by FIGS. 3, 4 and 5.

As FIG. 3 illustrates, the method 22 for the 3D association of bistatic blips according to the invention implements two successive processing modules, a first module 31 for forming triplets of pairs (blip, transmitter) considered as compatible and a second module 32 for forming n-uplets of pairs (blip, transmitter). The blips forming the duly constituted n-uplets are then delivered to the track initialization module 23 proper, in the form of groups or packets of blips 35.

These two processing modules themselves use two complementary modules, a first complementary module 33 which establishes the list of the available candidate blips and a second complementary module 34 which handles the management and the formation of pairs (blip, transmitter). Hereinafter in the text, the operation of each of the different modules, and the interaction between modules, are described.

It should be noted that the expression "triplets of "compatible" pairs (blip, transmitter)" should be understood to mean triplets for which the blips probably correspond to one and the same potential target.

The module 31 for forming compatible triplets, or, more simply, the module for forming triplets, is illustrated by FIG. 4. It consists mainly in trying to associate three pairs with one another, each pair being made up of a candidate blip and a transmitter. The candidate blip is chosen by the module 34 from the list of free blips defined by the module 33. The formation of the pairs is performed by the module for managing pairs 34 which assigns to each candidate blip a transmitter out of those which make up the system. This assignment is done in such a way that, when a number of blips out of the chosen three candidate blips originate from one and the same receiver, they are associated with different transmitters.

According to the invention, the association of all the possible triplets of pairs (blip, transmitter) is attempted, bearing in mind that triplets are associated when, although they are formed by different bistatic bases, they probably correspond to one and the same target.

To this end, the module 31 for forming triplets comprises five distinct test steps described hereinafter in the text. These five steps are performed iteratively on all the possible pairs (blip, transmitter), $(P_i, Tx_j)$, with reference to a pair $(P_{ref}, Tx_{ref})$ taken as reference.

The first test step 41 consists in determining whether it possible to associate a first pair $(P_1, Tx_1)$ with the reference pair $(P_{ref}, Tx_{ref})$, the candidate pair as well as the reference pair being determined by the module 34 for managing and forming pairs. According to the invention, the pair $(P_1, Tx_1)$ is likely to be associated with the pair $(P_{ref}, Tx_{ref})$ if these two pairs probably correspond to one and the same target.

According to the invention, this test step can be implemented in different known ways. Nevertheless, in a preferred implementation, it is implemented as described hereinbelow.

For this step, the method according to the invention distinguishes two cases:
the case where the blips $P_1$ and $P_{ref}$ selected by the module 34 originate from one and the same receiver Rx,
the case where the blips $P_1$ and $P_{ref}$ originate from distinct receivers $Rx_1$ and $RX_{ref}$.

In the first case, the association test step 41 consists, in practice, in implementing the following four independent tests:

A first test (test 1) consists in determining whether the bistatic speeds $Vb_k(P_1)$ and $Vb_k(P_{ref})$ of the blips $P_1$ and $P_{ref}$ may correspond to one and the same target speed. It is considered to this end that, if the following is found:

$$|Vb_k(P_{ref})-Vb_k(P_1)|>2\cdot V_{max},$$

then the association of the blip $P_1$ with the blip $P_{ref}$ is not likely. $V_{max}$ here represents the maximum speed of the targets that are to be detected using the multistatic system considered.

A second test (test 2) consists in determining whether the values of the azimuths associated with the blips $P_1$ and $P_{ref}$ (i.e. the azimuths of the corresponding radar observations)

can correspond to one and the same target, given the accuracies $\sigma_{\theta_k}(P_1)$ and $\sigma_{\theta_k}(P_{ref})$ of the azimuth measurements performed. It is considered to this end that, if the following is found:

$$|\theta_k(P_{ref}) - \theta_k(P_1)| > 3 \cdot \sqrt{\sigma_{74_k}^2(P_{ref}) + \sigma_{\theta_k}^2(P_1)},$$

then the association of the blip $P_1$ with the blip $P_{ref}$ is not likely.

A third test (test 3) consists in determining whether the ellipsoids corresponding to the bistatic distances of the blips $P_1$ and $P_{ref}$, defined respectively in relation to the transmitter and the receiver forming the bistatic base relative to $P_1$ and to the transmitter and the receiver forming the bistatic base relative to $P_{ref}$, exhibit intersections. It is considered to this end that, if the following is found:

$$(Db_k(P_{ref}) - Db_k(P_1))^2 - \|\vec{x}_{Txref} - \vec{x}_{Tx1}\|^2 > 0,$$

then the association of the blips is impossible.

$$\vec{x}_{Tx1} = [x_{Tx1}\ y_{Tx1}\ z_{Tx1}]^T$$

here corresponds to the Cartesian position of the transmitter $Tx_1$ associated with $P_1$ and $$\vec{x}_{Txrrf} = [x_{Txrrf}\ y_{Txrrf}\ z_{Txrrf}]^T$$

corresponds to the Cartesian position of the transmitter $Tx_{ref}$ associated with $P_{ref}$.

A fourth test (test 4) consists in determining whether the intersections of the ellipsoids constructed from the bistatic distances characterizing the blips $P_1$ and $P_{ref}$ are compatible with the azimuth measurements (i.e. the azimuths of the corresponding observations).

To this end, the bearing $\phi$ is considered, according to which the potential target corresponding to the blips considered can be observed. $\phi$ is defined by the relationship:

$$\cos\varphi = \frac{p_{ref} - p_1}{p_{ref} \cdot e_1 \cdot \cos(\theta_k - \theta_{0,1}) - p_1 \cdot e_2 \cdot \cos(\theta_k - \theta_{0,2})}$$

In this relationship, $P_1$, $e_1$, $P_{ref}$, $e_{ref}$ ever are defined by the following relationships (i=1 or ref depending on the case):

$$p_i = \frac{Db_k(P_i) - L_i^2}{2 \cdot Db_k(P_i)}$$

$$e_i = \frac{L_i}{Db_i}$$

with $$L_i = \|\vec{x}_{Txi} - \vec{x}_{Rx}\|$$

Similarly, $X_{Rx}$ and $Y_{Rx}$ representing the coordinates of the receiver considered, $\tan\theta_{0,1}$ and $\tan_{0,ref}$ are expressed (i=1 or ref depending on the case):

$$\tan\theta_{0,i} = \frac{y_{Txi} - y_{Rx}}{x_{Txi} - x_{Rx}}$$

Furthermore, $\theta_k$ is expressed:

$$\theta_k = \left(\frac{\frac{\theta_k(P_1)}{\sigma_{\theta_k}^2(P_1)} + \frac{\theta_k(P_{ref})}{\sigma_{\theta_k}^2(P_{ref})}}{\frac{1}{\sigma_{B_h(P_t)}^2} + \frac{1}{\sigma_{\theta_k}^2(P_{ref})}}\right)$$

The uncertainty $\sigma_{\cos\phi}$ affecting the determination of $\cos\phi$ is also considered, defined by:

$$\sigma_{\cos\varphi} = \sqrt{\left(\frac{\partial\cos\varphi}{\partial Db_k(P_1)} \cdot \sigma_{Db_k(P_1)}\right)^2 + \left(\frac{\partial\cos\varphi}{\partial Db_k(P_{ref})} \cdot \sigma_{Db_k(P_{ref})}\right)^2 + \left(\frac{\partial\cos\varphi}{\partial\theta_k} \cdot \sigma_{\theta_k}\right)^2}$$

Consequently, it is considered that, if the following is found:

$$\lfloor \cos\phi - 3\cdot\sigma_{\cos\phi},\ \cos\phi + 3\cdot\sigma_{\cos\phi} \rfloor \cap [0,1] \approx \emptyset,$$

then the association of blips $P_1$ and $P_{ref}$ is impossible.

According to the invention, these four independent tests which constitute the test step 41 can be performed in any order. However, the test step 41 is considered to have been successfully passed only if the four tests described previously are successfully passed by the blip $P_1$ considered.

In the second case, the blips $P_1$ and $P_{ref}$ originating from distinct receivers $Rx_1$ and $Rx_{ref}$, the association test step 41 consists, in practice, in consecutively implementing the following four tests:

The first test (test A) consists in determining, by any known appropriate method, whether it is possible to define, within the range limit of the detection system considered, an intersection of the directions of the azimuths of the observations corresponding to the blips $P_1$ and $P_{ref}$.

If it is possible, this intersection is calculated, by taking into account the uncertainties of the measurements of the azimuths so that an area of intersection is defined. If this condition is not satisfied, the association of the blips is considered to be impossible.

The second test (test B) consists, by considering the spheres containing the ellipsoids defined by the bistatic distances of the blips $P_1$ and $P_{ref}$, in determining, also by any known appropriate method, whether the two duly defined spheres exhibit an intersection. If that is not the case, the association of the blips is considered to be impossible.

The third test (test C) consists in determining whether the two ellipsoids defined previously exhibit an intersection.

This determination can, for example, be made by means of the Lagrange multiplying method. For two ellipsoids E1 and E2, this method consists in finding two ellipsoids E1' and E1", homothetic transforms of E1 and respectively smaller and larger than the latter, which cut E2. This type of resolution is conventional in the computer management of collisions between three-dimensional objects.

The result obtained is a Boolean variable whose value indicates whether, yes or no, the two ellipsoids considered exhibit an intersection. If there is no intersection, the association of the blips is considered to be impossible.

The fourth test (test D) finally consists in determining whether the measurements of the bistatic distances associated with the blips $P_1$ and $P_{ref}$ are compatible with the area of intersection of the directions of the azimuths of the observations corresponding to the blips $P_1$ and $P_{ref}$ determined in the test A.

According to the invention, these four tests A, B, C and D which constitute the test step 41 are performed in sequence, the execution of one test being performed only if the preceding test has been successfully passed. Consequently, the test step 41 is considered to have been successfully passed only if the four tests described previously are successfully passed by the blip $P_1$ considered.

The second test step 42 consists in determining whether it is possible to associate a second pair $(P_2, Tx_2)$, also determined by the module 34 which handles the management and the forming of the pairs $(P_i, Tx_j)$, with the reference pair $(P_{ref}, Tx_{ref})$, also determined by the module 34.

As for the first test step 41, the method according to the invention, in a preferred implementation, again distinguishes two cases:
the case where the blips $P_2$ and $P_{ref}$ are originated by one and the same receiver Rx,
the case where the blips $P_2$ and $P_{ref}$ are originated by distinct receivers $Rx_2$ and $Rx_{ref}$.

The unitary association tests implemented in the test step 42 are identical to the tests described previously for the first test step 41, but considering the blip $P_2$ instead of the blip $P_1$.

As FIG. 4 illustrates, each of the test steps 41 and 42 works by iterative operation. In practice, until the association of a pair $(P_1, Tx_1)$ and a pair $(P_2, Tx_2)$ with the reference pair $(P_{ref}, Tx_{ref})$ is completed, the steps 41 and 42 are repeated. The module 31 proceeds with a new test of association of the reference pair $(P_{ref}, Tx_{ref})$ with another candidate pair. Moreover, if no association finally proves possible with the reference pair $(P_{ref}, Tx_{ref})$ considered, the steps 41 and 42 are reiterated by choosing a new reference pair. According to the invention, the choice of a given reference pair $(P_{ref}, Tx_{ref})$ is made by the management module 34 by taking into account the association tests already performed for each of the steps 41 and 42.

Consequently, the iteration of the steps 41 and 42 is stopped as soon as two candidate pairs $(P_1, Tx_1)$ and $(P_2, Tx_2)$ are associated with the reference pair $(P_{ref}, Tx_{ref})$. The execution of the module 31 then continues with the next step 43.

It should be noted that the second step can advantageously be implemented either in parallel with the step 41, as illustrated in FIG. 4, or following the step 41, when a pair $(P_1, Tx_1)$ is associated with the reference pair $(P_{ref}, Tx_{ref})$ considered.

As for the third test step 43, it consists in determining whether it is possible to associate the pair $(P_2, Tx_2)$ with the pair $(P_1, Tx_1)$ with one and the same target. For this, the method proceeds in a way similar to the test steps 41 and 42.

Consequently, if the test of association of the pairs $(P_2, Tx_2)$ and $(P_1, Tx_1)$ is conclusive, the triplet of pairs $(P_{ref}, Tx_{ref})$, $(P_1, Tx_1)$ and $(P_2, Tx_2)$ is validated and the execution of the module 31 then continues with the next step 44.

On the other hand, if the test fails, the steps 41 and 42 are repeated. The module 31 proceeds with a new test of association of the reference pair $(P_{ref}, Tx_{ref})$ (or with another reference pair) with other candidate pairs $(P_2, Tx_2)$ and $(P_1, Tx_1)$.

The object of the fourth test step 44 is to determine whether the associated blips $P_1$, $P_2$ and $P_{ref}$ probably correspond to one and the same object, one and the same target. For this, the bistatic distance, bistatic speed and azimuth measurements performed on the radar observations corresponding to the blips $P_1$, $P_2$ and $P_{ref}$ are used. The Cartesian position $$\vec{x}_{1,2,ref}$$

and the speed $$\vec{v}_{1,2,ref}$$

of the object corresponding to the associated blips are first calculated. Then, the results obtained are used to perform the projection of the parameters of this target into the bistatic bases having produced the bistatic blips $P_1$, $P_2$ and $P_{ref}$ considered and to compare the duly determined bistatic parameters with those of the blips $P_1$, $P_2$ and $P_{ref}$. Interest is first focused on the bistatic distances.

Consequently, the duly obtained projections are compared with each blip $P_1$, $P_2$ and $P_{ref}$. For each blip $P_i$, the following inequality should be verified $$|Db_k(P_i)-Db_{proj}(P_i)| \leq 3 \cdot \sqrt{\sigma_{Db_k}^2(P_i)+\sigma_{Db_{proj}}^2(P_i)}$$

where $Db_{proj}$ is the bistatic distance obtained by projection of $$\vec{x}_{1,2,ref}$$

into the bistatic base associated with the blip $P_i$, and $\sigma_{Db_{proj}}(P_i)$ is the associated standard deviation, If this inequality is not verified, the triplet of pairs $(P_1, Tx_1)$ $(P_2, Tx_2)$ and $(P_{ref}, Tx_{ref})$ is discarded. As in the case of failure of the third test step, the steps 41, 42 and 43 are then reiterated with two other pairs $(P_1, Tx_1)$ $(P_2, Tx_2)$ and, if appropriate, with another reference pair $(P_{ref}, Tx_{ref})$.

On the other hand, in the contrary case, the triplet of pairs $(P_1, Tx_1)$, $(P_2, Tx_2)$ and $(P_{ref}, Tx_{ref})$ is retained and the execution of the module 31 then continues with the next step 45.

According to the invention, the Cartesian parameters of the target corresponding to the blips $P_1$, $P_2$ and $P_{ref}$ can obviously be determined by any known method from the bistatic parameters of the blips considered. Similarly, the projection (i.e. the transposition) of the Cartesian parameters of the duly determined target into bistatic parameters relating to the different bistatic bases from which $P_1$, $P_2$ and $P_{ref}$ originate, can be performed by any known projection method.

Nevertheless, it should be noted that the Cartesian position can be determined, as described previously, from the intersections of the ellipsoids corresponding to the bistatic distances of the blips $P_1$, $P_2$ and $P_{ref}$.

Consequently, the Cartesian position of the target being determined in this way, the calculation of the Cartesian speed can be performed in a simple manner by any known method.

The object of the fifth test step 45 of the module 31 is to check that the target corresponding to the associated blips $P_1$, $P_2$ and $P_{ref}$ does indeed correspond to a real target. For this, the absolute value of the Cartesian speed determined in the preceding step is compared to a threshold corresponding to the maximum speed at which a real target is assumed to be able to move.

Consequently, if the modulus of the determined Cartesian speed is greater than that maximum value, the triplet of pairs $(P_1, Tx_1)$, $(P_2, Tx_2)$ and $(P_{ref}, Tx_{ref})$ is discarded. As in the case of failure of the third or fourth test step, the steps 41 to 44 are then reiterated with two other pairs $(P_1, Tx_1)$, $(P_2, Tx_2)$ and, if appropriate, with another reference pair $(P_{ref}, Tx_{ref})$.

In the contrary case, the triplet of pairs considered is finally retained,

From an overall operational point of view, the object of the module 31 is to determine, by considering a given pair (blip, transmitter) taken as reference ($P_{ref}$, $Tx_{ref}$), all of the pairs ($P_i$, $Tx_j$) that can be associated in triplets, that is to say likely to correspond to one and the same target. Consequently, its execution is reiterated by successively considering all the possible associations of the pairs forming the list of the candidate pairs with the reference pair ($P_{ref}$, $Tx_{ref}$). Finally, the iteration of the module 31 ceases when all the possible associations in triplets have been tested.

Moreover, each of the iterations performed ends, in case of success in the association tests, with a step 46 during which, if appropriate, the triplet ($P_1$, $Tx_1$), ($P_2$, $Tx_2$) and ($P_{ref}$, $Tx_{ref}$) constructed for that iteration is stored.

It should be noted that the determination at each instant of the pairs ($P_1$, $Tx_1$) ($P_2$, $Tx_2$) and ($P_{ref}$, $Tx_{ref}$) for which the possibility of association has to be determined, is performed by the management module 34. To perform this task, the module 34 receives from the module 31 information relating to the failure of the tests performed during the test steps 41 to 45. The transmission of this information is symbolized by the broken line arrows in FIG. 4.

Thus, if the test performed by the step 41 or the step 42 fails, the pair ($P_1$, $Tx_1$) or ($P_2$, $Tx_2$) considered is replaced with another candidate pair and the module 31 is again executed. Furthermore, if all the candidate pairs have been tested without success with the reference pair considered, the latter is replaced, by the management module 34, with another reference pair.

Similarly, if the test performed by the step 43, 44 or 45 fails, the pairs ($P_1$, $Tx_1$) and ($P_2$, $Tx_2$) considered are replaced, by the management module 34, with two other candidate pairs and the module 31 is again executed. Furthermore, if all the candidate pairs have been tested without success with the reference pair, the latter is replaced with another reference pair.

Moreover, it should also be noted that, when the association of candidate pairs ($P_1$, $Tx_1$) and ($P_2$, $Tx_2$) and the reference pair ($P_{ref}$, $Tx_{ref}$) considered is carried out successfully, the module 31 transmits to the module 34, in the step 46, an end-of-execution information item which informs this module that a new association of the reference pair ($P_{ref}$, $Tx_{ref}$) with other candidate pairs ($P_1$, $Tx_1$) and ($P_2$, $Tx_2$) can be tested. Furthermore, if all the candidate pairs have been tested, with or without success, with the reference pair, the process of forming triplets from the reference pair ($P_{ref}$, $Tx_{ref}$) is ended and the execution of the module 31 gives way to the execution of the module 32 for forming n-uplets.

Thus, the management module 34 manages the iterative execution of the module 31 for forming triplets, this execution being stopped when, for the reference pair ($P_{ref}$, $Tx_{ref}$) considered, all the triplets of candidate pairs have been considered.

The validated triplets, stored during the step 46 of the module 31, are used by the module 32 for forming n-uplets. The theoretical block diagram of the module 32, represented in FIG. 5, shows that this module comprises four processing steps, The objective of the first step 51 is to analyse the available validated triplets. These triplets constructed by the implementation of the module 31 comprise one and the same reference pair ($P_{ref}$, $Tx_{ref}$). The analysis consists here in determining, by comparing all the triplets formed, the pairs ($P_i$, $Tx_j$) for which the following properties are verified for all the triplets simultaneously:

the blip $P_i$ is always associated with one and the same transmitter $Tx_j$, the transmitter $Tx_j$ is always associated with one and the same blip $P_i$.

Consequently, the pairs (blip, transmitter) verifying these two properties are associated in one and the same set, called n-uplet, n representing the number of pairs ($P_i$, $Tx_1$) forming the set considered.

Thus, for example, if, for a given reference pair ($P_1$, $Tx_1$) there are, after the execution of the module 31, four triplets described by the following Table 1:

| Triplet n°1 | | Triplet n°2 | | Triplet n°3 | | Triplet n°4 | |
|---|---|---|---|---|---|---|---|
| $Tx_1$ | $P_1$ | $Tx_1$ | $P_1$ | $Tx_1$ | $P_1$ | $Tx_1$ | $P_1$ |
| $Tx_2$ | $P_2$ | $Tx_2$ | $P_3$ | $Tx_4$ | $P_6$ | $Tx_4$ | $P_6$ |
| $Tx_3$ | $P_3$ | $Tx_4$ | $P_6$ | $Tx_5$ | $P_5$ | $Tx_7$ | $P_4$ | the n-uplet formed from these triplets in accordance with the method according to the invention, a quadruplet in this example, will be described by the following Table 2:

| n-uplet | |
|---|---|
| $Tx_1$ | $P_1$ |
| $Tx_4$ | $P_6$ |
| $Tx_5$ | $P_5$ |
| $TX_7$ | $P_4$ |

The blips $P_2$ and $P_3$ are here discarded from the quadruplet because $TX_2$ is associated with two different blips, namely $P_2$ and $P_3$, and $P_3$ is associated with two different transmitters, namely $TX_2$ and $Tx_3$.

Thus, for the reference pair ($P_{ref}$, $Tx_{ref}$) considered, the step 51 makes it possible to form n-uplets of pairs ($P_i$, $Tx_j$) for which each blip is bijectively associated with one transmitter.

The object of the second step 52 is to analyse and filter the n-uplets formed in the step 51 according to the number and the nature of the pairs ($P_i$, $Tx_j$) contained in these n-uplets.

Thus, according to the invention, if the n-uplet formed comprises fewer than three pairs or else if this n-uplet does not include the reference pair ($P_{ref}$, $Tx_{ref}$), from which the triplets have been formed, the n-uplet formed is eliminated. Consequently, the module 32 transmits to the module 34 managing the pairs ($P_i$, $Tx_j$) an information item leading the module 34 to choose another pair ($P_i$, $Tx_j$) as reference pair and relaunch the execution of the module 31. On the other hand, if the n-uplet formed comprises three pairs or more, and if this n-uplet includes the reference pair ($P_{ref}$, $Tx_{ref}$), it is retained and used in the next step.

The object of the third step 53 of the module 32 is to check the consistency of the n-uplet of pairs formed in the step 51 and having gone through the step 52. This consistency check consists mainly in determining whether the blips forming the pairs of the n-uplet probably correspond to one and the same object.

For this, as in the case of the test step 44 of the module 31 for forming triplets, the bistatic distance, bistatic speed and azimuth measurements performed on the radar observations corresponding to the blips forming the n-uplet are used. The Cartesian position and the speed of the object corresponding to the blips considered are first calculated. Then, the results obtained are used to perform the projection (i.e. the transposition) of the Cartesian parameters of the newly determined target into bistatic parameters relating to the different bistatic bases having produced the blips considered, and to compare the duly determined bistatic parameters to those of these blips.

In the case where the check is positive, the n-uplet is retained.

In the contrary case, it is rejected and the module 32 transmits to the module 34 managing the pairs ($P_i$, $Tx_j$), an information item leading this module to choose another pair ($P_i$, $Tx_j$) as reference pair and to relaunch the execution of the module 31 and of the module 32.

As for the fourth step 54, it consists in storing the n-uplets that have successfully passed the steps 52 and 53, the blips forming these n-uplets, intended to be used to form new Cartesian tracks, constitute packets or groups of blips which are transmitted to the track initialization module 23 proper.

It also consists in transmitting an information item to the management module 34, leading this module to choose another pair ($P_i$, $Tx_j$) as reference pair and to relaunch the execution of the module 31 and of the module 32.

It also consists, at the moment when an n-uplet is stored, in transmitting to the module 33 for updating the list of the available blips, the list of the blips forming the n-uplet. The module 33 updates the list of the blips available accordingly and communicates the updated list to the management module 34 which manages the candidate pairs ($P_i$, $Tx_j$), to which the module 31 for forming triplets is applied.

From an overall operational point of view, the module 32 for forming n-uplets is executed for each reference pair ($P_{ref}$, $Tx_{ref}$) from the triplets of pairs (blip, transmitter) constructed by iterative execution of the module 31. Consequently, the method for the 3D association of blips according to the invention operates on the basis of two nested iteration loops, managed from the management module 34 and the update module 33. The first loop, on all the candidate pairs ($P_i$, $Tx_j$), illustrated by the broken line arrow 36 in FIG. 3, relates to the iterative execution of the module 31. The second loop, performed on all the reference pairs ($P_{ref}$, $Tx_{ref}$), illustrated by the broken line arrow 37 in FIG. 3, relates to the iterative execution of the set constructed by the modules 31 and 32.

Thus, the implementation of the method according to the invention consists, for a pair ($P_{ref}$, $Tx_{ref}$), in executing a sequence consisting:

in determining, by successive iterations of the module 31 on the pairs ($P_i$, $Tx_j$), all the compatible triplets determined from the pair ($P_{ref}$, $Tx_{ref}$);

in forming, from these triplets, the n-uplet corresponding to the pair ($P_{ref}$, $Tx_{ref}$), by execution of the module 32;

this sequence being repeated for each pair (blip, transmitter) defined as reference pair by the module 34 from the list of blips available created by the module 33.

The n-uplets of blips thus obtained by implementation of the method for the 3D association of blips according to the invention are committed to memory in the form of a set of validated blips which can, for example, be used, as described hereinafter in the document, in an overall method for initializing Cartesian tracks from bistatic blips in the context, for example, of the tracking performed by a multistatic radar comprising one or more receivers forming a plurality of bistatic bases.

Figure 7:
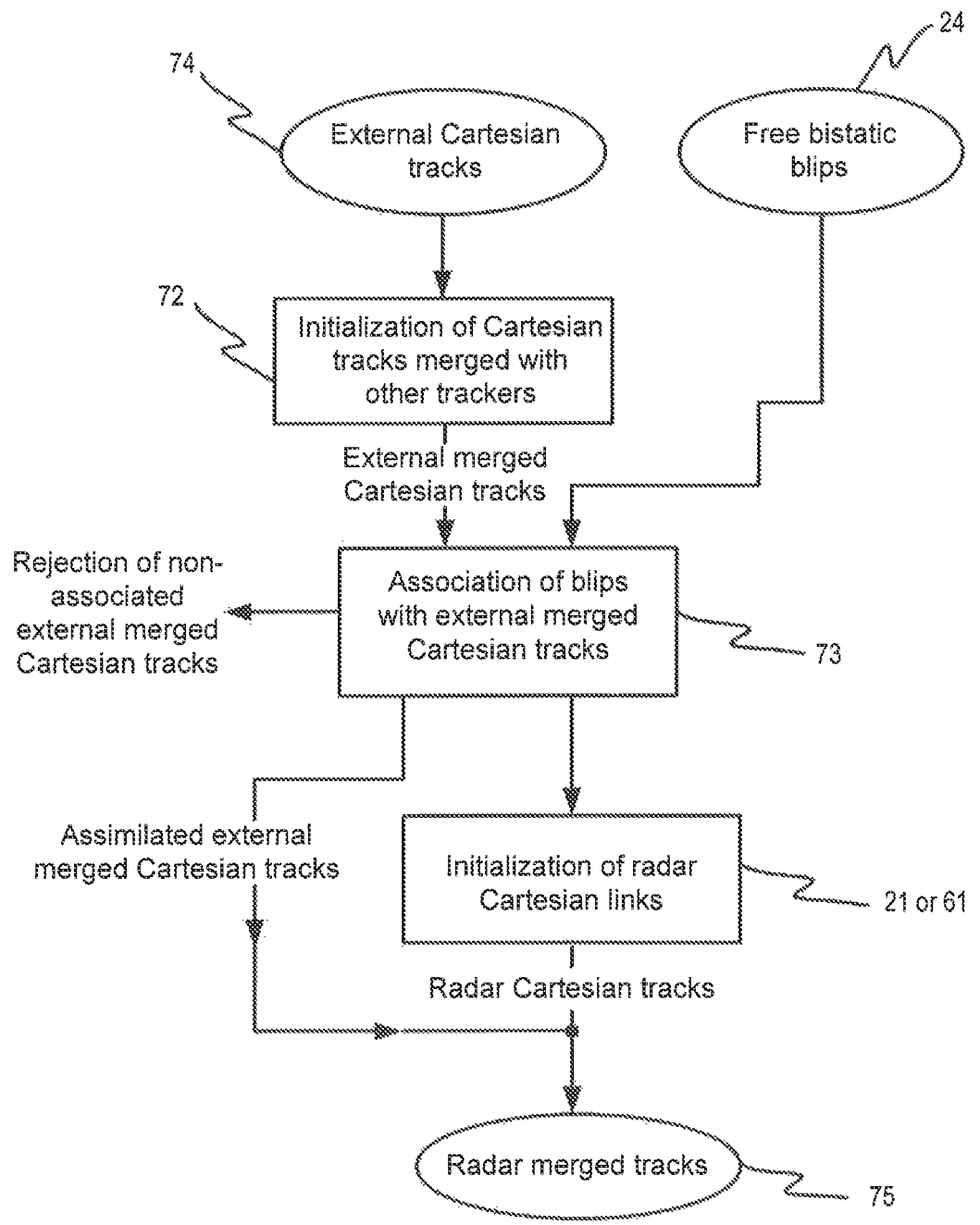
FIG. 7, an exemplary initialization method which performs an initialization of radar Cartesian tracks by associating bistatic blips and Cartesian tracks already formed.

As FIGS. 2, 6 and 7 illustrate, the method according to the invention can be implemented as a step of a track initialization method, preliminary to an actual initialization step 23. FIGS. 2 and 6 more particularly show examples of methods for initializing Cartesian tracks 25, which take into consideration only bistatic blips 24, methods that can be applied notably to perform the initialization of individual Cartesian tracks 18 of the tracking method shown in FIG. 1. FIG. 7 more particularly shows an example of an initialization method which performs an initialization of radar Cartesian tracks by associating bistatic blips and Cartesian tracks already formed, originating, for example, from other technical means associated with the multistatic radar system considered.

In the initialization method 21 illustrated by FIG. 2, the bistatic blips 24 produced at a given instant, blips which correspond to observations performed by the radar system and considered to relate to potential targets, are directly analysed by the preliminary step 22 implementing the method according to the invention. Then, the pairs (blip, transmitter) retained on completion of the step 22 that are significant, probably corresponding to targets, are used in the actual track initialization step 23.

The initialization step 23 can be performed in different known ways, inasmuch as it consists in determining, from the parameters of the blips forming the n-uplets constructed on completion of the step 22, the parameters of the corresponding targets. However, in a preferred implementation, the initialization step is performed in different substeps:

a first substep during which a first rough estimation of the position of the target is made. This first estimation is made by implementing the gradient algorithm or by any known appropriate method. These methods require three blips or more when only the bistatic distance information is used.

a second step during which an exhaustive intersection calculation is performed which makes it possible to determine, in a known manner, the position of the target, as well as an estimation of the covariance matrix associated with that position, from the measurements of the bistatic distances of the blips considered and from the accuracy of those distances, as well as from the positions of the receiver and the transmitters considered. One method that makes it possible to perform an exhaustive calculation is notably described in the French patent application bearing the number FR2910131.

Consequently, a track is initialized if:

the position of the target can be determined the estimated standard deviations of the Cartesian coordinates (x, y, z) of the target do not exceed a given value.

In this case, the second step is followed:

by a third substep during which the speed of the target is calculated;

by a fourth substep during which the initial covariance matrix C of the state of the target is estimated from the Cramer Rao limits determined by virtue of the accuracies of the bistatic distance, bistatic speed and azimuth measurements. For N blips $P_1, P_2, \ldots, P_N$, the Cramer Rao limits are expressed as follows:

$$C = P \cdot \begin{pmatrix} \sigma^2_{Db_k}(P_1) & 0 & \cdots & 0 & 0 \\ 0 & \sigma^2_{Vb_k}(P_1) & \ddots & 0 & 0 \\ \vdots & \ddots & \ddots & \ddots & \vdots \\ 0 & 0 & \ddots & \sigma^2_{Db_k}(P_N) & 0 \\ 0 & 0 & \cdots & 0 & \sigma^2_{Vb_k}(P_N) \end{pmatrix} \cdot P^T$$

with

-continued $$P = \begin{pmatrix} \frac{\partial Db_k(P_1)}{\partial x} & \frac{\partial Vb_k(P_1)}{\partial x} & \cdots & \frac{\partial Db_k(P_N)}{\partial x} & \frac{\partial Vb_k(P_N)}{\partial x} \\ \frac{\partial Db_k(P_1)}{\partial v_x} & \frac{\partial Vb_k(P_1)}{\partial v_x} & \cdots & \frac{\partial Db_k(P_N)}{\partial v_x} & \frac{\partial Vb_k(P_N)}{\partial v_x} \\ \frac{\partial Db_k(P_1)}{\partial y} & \frac{\partial Vb_k(P_1)}{\partial y} & \cdots & \frac{\partial Db_k(P_N)}{\partial y} & \frac{\partial Vb_k(P_N)}{\partial y} \\ \frac{\partial Db_k(P_1)}{\partial v_y} & \frac{\partial Vb_k(P_1)}{\partial v_y} & \cdots & \frac{\partial Db_k(P_N)}{\partial v_y} & \frac{\partial Vb_k(P_N)}{\partial v_y} \\ \frac{\partial Db_k(P_1)}{\partial z} & \frac{\partial Vb_k(P_1)}{\partial z} & \cdots & \frac{\partial Db_k(P_N)}{\partial z} & \frac{\partial Vb_k(P_N)}{\partial z} \\ \frac{\partial Db_k(P_1)}{\partial v_z} & \frac{\partial Vb_k(P_1)}{\partial v_z} & \cdots & \frac{\partial Db_k(P_N)}{\partial v_z} & \frac{\partial Vb_k(P_N)}{\partial v_z} \end{pmatrix}$$

by a fifth substep during which the new track is constructed by associating all the attributes which characterize it.

In the initialization method 61 illustrated by FIG. 6, more complex than that represented in FIG. 2, the step 22 implementing the method for the 3D association of blips according to the invention is associated with a complementary step 62 implementing a method for the 2D association of blips, a simplified method consisting in trying to associate the bistatic blips 24 produced by the radar system, the analysis of the compatibility of the blips being, in this case, performed by not taking into account the altitude of the observations corresponding to the blips considered, or the relative altitudes of the transmitters and the receivers forming the radar system. It generally makes it possible to perform, in a simple manner, a first association of blips which are directly transmitted to the actual initialization step 23. Consequently, the step 22 of 3D association of blips is applied only to just the blips that have not been able to be associated in the 2D association step 62.

Compared to the preceding implementation, this implementation of the initialization method presents the advantage of making it possible to process, at one and the same time, a greater number of bistatic blips, the step 62 being faster to execute than the step 22.

The method of the 2D association step 62 consists globally in associating, a priori, bistatic blips and in testing the validity of this association by determining whether a real target can correspond to that association, bearing in mind that all the possible associations are studied. The determination is mainly performed by searching for the intersections of the projections into one and the same horizontal plane of the ellipsoids defined from the bistatic distances of the associated blips.

Different known methods, not described here, can be used to perform such a 2D association.

However, in a preferred implementation, the 2D association is performed by implementing an association module comprising two steps.

The first step associates two blips formed from one and the same receiver; these two blips forming a base with which the blips formed from all the receivers are then successively associated. During this first step, the validity of the association of the first two blips formed from one and the same receiver is first tested. If this validity is verified, the validity of the association of these two blips with the blips formed from all the receivers is tested by choosing them one after the other. The first step is performed for all the possible associations. Consequently, the n-uplets of blips forming validated associations are considered as probably corresponding to one and the same real target, and stored.

The second step first associates two blips formed from different receivers and tests the validity of this association, then associates these two blips with all the other blips obtained from all the receivers one after the other.

Consequently, as for the first step, the n-uplets of blips forming validated associations are considered as probably corresponding to one and the same real target, and stored. However, the triplets of blips tested are here those which do not form part of any of the n-uplets retained in the first step.

In the case where there is only a single receiver, only the first step is performed.

The method 71 for initializing merged radar tracks, illustrated by FIG. 7, incorporates the initialization method 61 illustrated by FIG. 6 in a broader functional structure. The object of the method presented is to perform the initialization of new Cartesian tracks from bistatic blips and from Cartesian tracks already formed. In particular, in the case where there are Cartesian tracks available delivered by ancillary means associated with the multistatic radar system considered, the object of the method illustrated by FIG. 7 is, in a first stage, to try to merge the external Cartesian tracks produced from various means associated with the radar, then to associate with these merged Cartesian tracks, called "external merged Cartesian tracks", radar bistatic blips newly formed and not yet used to form radar Cartesian tracks.

The method 71 presented here associates with the association method according to the invention in its simple form 21 (3D association, 22) illustrated by FIG. 2 or in its more complex form 61 (3D, 22, and 2D, 62, associations) illustrated by FIG. 6, with a complementary association processing comprising two steps 72 and 73:

The first step 72 proceeds with the association of the external Cartesian tracks 74, the association of these external Cartesian tracks with one another being able to be performed, according to the invention, by any known method, appropriate to the merging of tracks. The function of this association step is firstly to determine whether two external Cartesian tracks are compatible, that is to say whether they can be considered to represent one and the same object. This object is then, if such is the case, to construct a merged track for which the attributes are functions of the attributes of the two external Cartesian tracks recognized as compatible. The step 72 thus delivers merged Cartesian tracks called "external merged Cartesian tracks".

The function of the second step 73 is to try to associate free bistatic radar blips, not yet associated to initialize radar Cartesian tracks, with external merged Cartesian tracks formed during the preceding step 72. According to the invention, the association is performed by any known blip-track association method which makes it possible to maintain a track using blips, a blip corresponding to the detection and to the characterization of a given object. It notably comprises the implementation of a blip-track association test.

Consequently, if an external merged track can be associated with a bistatic blip, the association is performed and the track incorporates this blip. The duly formed track, called "assimilated merged external Cartesian tracks", is considered to be an initialized radar track. On the other hand, if an external merged Cartesian track which cannot be associated with any bistatic blip, is rejected.

According to this method, the non-associated free bistatic blips are transmitted to the method for the 3D association of blips according to the invention 21 or 61 to initialize radar tracks.

According to this application, as FIG. 7 illustrates, the radar tracks that are ultimately thus initialized by implementing the method 21 or 61 according to the invention, as well as the assimilated merged external Cartesian tracks, constitute new radar Cartesian tracks 75, intended to be analysed by the actual radar tracking means.

The invention claimed is:

1. A method for associating bistatic blips implemented by a multistatic radar system comprising a plurality of transmitters and receivers remote from one another, said bistatic blips being received by said receivers and corresponding to one and a same target detected by said radar system, one pair (transmitter, receiver) forming a bistatic base of said radar system, each bistatic blip $P_i$ corresponding to the echo originating from the signal transmitted by a transmitter $Tx_j$ and received by a receiver $E_k$, each bistatic blip $P_i$ being characterized by the transmitter $Tx_j$ having transmitted the signal of which it is the echo, wherein, the bistatic blips formed being associated with the different transmitters of the system to form a set of pairs (blip, transmitter), it comprises:
 a first step, implemented by a module for forming triplets of pairs (Pi, $Tx_j$), said first step forming triplets combining pairs (blip, transmitter) which exhibit a distance and speed compatibility;
 a second step, implemented by a module for forming n-uplets of pairs (Pi, $Tx_j$), said second step forming n-uplets combining triplets formed in the preceding step satisfying given combination criteria which characterize a likelihood of the attribution of the different triplets to one and the same target;
 the duly constituted n-uplets forming packets of blips which define one and the same target.

2. The method according to claim 1, wherein the first step implemented by the module for forming triplets of pairs (blip, transmitter) is an iterative step which considers, on each iteration, three pairs (blip, transmitter), a first pair $(P_1, Tx_1)$, a second pair $(P_2, Tx_2)$ and a third pair $(P_{ref}, Tx_{ref})$ taken as a reference pair and which applies to them an association test which tests the possibility of associating the first pair $(P_1, Tx_1)$ and the second pair $(P_2, Tx_2)$ to the reference pair $(P_{ref}, Tx_{ref})$, a pair (blip, transmitter) being able to be associated with the reference pair if the characteristics of the target corresponding to the blip considered are compatible with the characteristics of the target corresponding to the blip forming the reference pair; three pairs $(P_{ref}, Tx_{ref})$, $(P_1, Tx_1)$ and $(P_2, Tx_2)$, for which the association test is successful, forming a triplet of pairs.

3. The method according to claim 2, wherein the first step implemented by the module for forming triplets of pairs (blip, transmitter) itself comprises the following operations:
 a first sub step comprising an association test to determine whether the pairs $(P_{ref}, Tx_{ref})$ and $(P_1, Tx_1)$ can be associated;
 a second sub step comprising an association test to determine whether the pairs $(P_{ref}, Tx_{ref})$ and $(P_2, Tx_2)$ can be associated;
 a third sub step comprising a test of compatibility of the pairs $(P_1, Tx_1)$ and $(P_2, Tx_2)$;
 a fourth sub step comprising a test of compatibilities of the bistatic distances of the blips;
 a fifth sub step comprising a test to test the likelihood of the Cartesian speed of the target corresponding to the associated blips;
 a sixth sub step comprising an operation of storage of the triplets formed from pairs $(P_1, Tx_i)$ and $(P_2, Tx_2)$ having successfully passed all the tests;
 the association test implemented in the first sub step being identical to the one implemented in the second sub step.

4. The method according to claim 3, wherein, in the case where the blips $P_1$ and $P_{ref}$ selected by a complementary module originate from one and the same receiver Rx, the association test implemented in the first sub step consists in implementing the following four independent tests:
 a first test consisting in determining whether the bistatic speeds $Vb_k(P_1)$ and $Vb_k(P_{ref})$ of the blips $P_1$ and $P_{ref}$ can correspond to one and the same target speed, the first test being negative if the following is found:

$$|Vb_k(P_{ref}) - Vb_k(P_1)| > 2V_{max}$$

where $V_{max}$ represents the maximum speed of the targets that are to be detected;
 a second test consisting in determining whether the values of the azimuths the azimuths $\theta_k(P_1)$ and $\theta_k(P_{ref})$ associated associated with the blips $P_1$ and $P_{ref}$ can correspond to one and the same target, given the accuracies $\sigma_{\theta k}(P_1)$ and $\sigma_{\theta k}(P_{ref})$ of the azimuth measurements performed; the second test being negative if the following is found:

$$|\theta_k(P_{ref}) - \theta_k(P_1)| > 3\sqrt{\sigma_{\theta_k}^2(P_{ref}) + \sigma_{\theta_k}^2(P_1)};$$

a third test consisting in determining whether ellipsoids corresponding to the bistatic distances $Db_k(P_1)$ and $Db_k(P_{ref})$ of the blips $P_1$ and $P_{ref}$ exhibit intersections, the third test being negative if the following is found:

$$(Db_k(P_{ref}) - Db_k(P_1))^2 - \|\vec{x}_{Txref} - \vec{x}_{Tx1}\|^2 > 0,$$

where $\vec{x}_{Tx1} = [x_{Tx1}\, y_{Tx1}\, z_{Tx1}]^T$ and $\vec{x}_{Txref} = [x_{Txref}\, y_{Txref}\, z_{Txref}]^T$ here correspond respectively to the Cartesian position of the transmitter $Tx_1$ associated with $P_1$ and to the Cartesian position of the transmitter $Tx_{ref}$ associated with $P_{ref}$;
 a fourth test consisting in determining whether the intersections of the ellipsoids constructed from the bistatic distances characterizing the blips $P_1$ and $P_{ref}$ are compatible with the azimuth measurements relating to these blips, the fourth test being negative if the following is found:

$$[\cos\phi - 3\sigma_{\cos\phi}, \cos\phi + 3\sigma_{\cos\phi}] \cap [0,1] \neq \emptyset,$$

where $\phi$ corresponds to the bearing according to which the potential target corresponding to the blips considered can be observed and $\sigma_{\cos\phi}$, the uncertainty affecting the determination of $\cos\phi$;
said association test, implemented in the first sub step, being positive if the results of the four tests are positive.

5. The method according to claim 4, wherein, in the case where the blips $P_2$ and $P_{ref}$ selected by the complementary module originate from one and the same receiver Rx, the association test implemented in the second sub step consists in implementing, on the blips $P_2$ and $P_{ref}$, the four independent tests implemented in the first sub step.

6. The method according to claim 5, wherein the third sub step comprising the test of compatibility is performed by the Lagrange multiplying method applied to the ellipsoids defined by the bistatic distances of the blips $P_1$ and $P_{ref}$ or the bistatic distances of the blips $P_2$ and $P_{ref}$.

7. The method according to claim 3, wherein, in the case where the blips $P_1$ and $P_{ref}$ selected by a complementary module originate from distinct receivers $Rx_1$ and $Rx_{ref}$, the association test implemented in the first sub step consists in consecutively implementing the following four tests:
 a first test consisting in determining whether it is possible to define, within the range limit of the detection system considered, an intersection of the directions of the azimuths of the observations corresponding to the blips $P_1$ and $P_{ref}$; and, if an intersection of the directions of the azimuths of the observations correspond to the blips $P_1$ and $P_{ref}$, in calculating this intersection, by taking into account the uncertainties of the measurements of the azimuths so that an area of intersection is defined;

a second test consisting, if the first test is positive, in determining whether two spheres containing the ellipsoids defined by the bistatic distances of the blips $P_1$ and $P_{ref}$ exhibit an intersection;

a third test consisting, if the second test is positive, in determining whether the ellipsoids defined by the bistatic distances of the blips $P_1$ and $P_{ref}$ exhibit an intersection;

a fourth test consisting, if the third test is positive, in determining whether the measurements of the bistatic distances associated with the blips $P_1$ and $P_{ref}$ are compatible with the area of intersection of the directions of the azimuths of the observations corresponding to the blips $P_1$ and $P_{ref}$ determined in the first test;

the association test being positive if the results of the four tests are positive.

8. The method according to claim 7, wherein, in the case where the blips $P_2$ and $P_{ref}$ selected by the complementary module originate from distinct receivers $Rx_2$ and $Rx_{ref}$, the association test implemented in the second sub step consists in consecutively implementing, on the blips $P_2$ and $P_{ref}$, the four tests implemented in the first sub step.

9. The method according to claim 7, wherein the third test is performed by the Lagrange multiplying method applied to the ellipsoids considered.

10. The method according to claim 3, wherein, in the case where the blips $P_1$ and $P_2$ selected by a complementary module originate from one and the same receiver Rx, the third sub step comprising a test of compatibility of the pairs $(P_1, Tx_1)$ and $(P_2, Tx_2)$ is performed by implementing, on the blips $P_1$ and $P_2$, tests similar to those implemented in the first sub step in the case where the blips $P_1$ and $P_{ref}$ selected by the complementary module originate from one and the same receiver.

11. The method according to claim 3, wherein, in the case where the blips $P_1$ and $P_2$ selected by a complementary module originate from distinct receivers $Rx_1$ and $Rx_2$, the third sub step comprising a test of compatibility of the pairs $(P_1, Tx_1)$ and $(P_2, Tx_2)$ is performed by implementing, on the blips $P_1$ and $P_2$, tests similar to those implemented in the first sub step in the case where the blips $P_1$ and $P_{ref}$ selected by the complementary module originate from distinct receivers.

12. The method according to claim 1, wherein the second step, implemented by the module for forming n-uplets of pairs (blip, transmitter) comprises the following sub steps:

a first sub step of forming n-uplets by analysing the validated triplets formed from one and the same reference pair $(P_{ref}, Tx_{ref})$, the analysis consisting in determining, by comparing all the triplets formed, the pairs $(P_i, Tx_j)$ for which the following properties are verified for all the triplets simultaneously;

the blip $P_i$ is always associated with one and the same transmitter $Tx_j$, the transmitter $Tx_j$ is always associated with one and the same blip $P_i$, the pairs (blip, transmitter) verifying these two properties being associated in one and the same set called n-uplet a second sub step, applied to the n-uplets formed in the first sub step according to the number and the nature of the pairs $(P_i, Tx_j)$ contained in these n-uplets; the object of which is to eliminate the n-uplets formed comprising fewer than three pairs or the n-uplets not comprising the reference pair $(P_{ref}, Tx_{ref})$;

a third sub step, the object of which is, for each n-uplet not eliminated by the second sub step, to check the consistency of the n-uplet, the consistency check consisting in determining, by using the measurements of bistatic distance, of bistatic speed and of azimuth performed on the radar observations corresponding to the blips forming the n-uplet, whether the blips forming the pairs of the n-uplet correspond in a likely manner to one and the same target;

a fourth sub step consisting in storing the n-uplets having successfully undergone the preceding sub steps; the blips forming these n-uplets constituting packets or groups of blips intended for the initialization of Cartesian tracks.

13. The method according to claim 12, wherein, during the third sub step, the Cartesian position and the speed of the target corresponding to the blips forming the n-uplet are first calculated, then the Cartesian parameters of the duly determined target are transposed into bistatic parameters relating to the different bistatic bases having produced the blips considered, and then the duly determined bistatic parameters are compared to those of the blips considered.

14. The method for initializing Cartesian tracks implemented by a multistatic radar system comprising a plurality of transmitters and receivers remote from one another, said bistatic track being initialized from bistatic blips corresponding to one and a same target detected by said radar system, one pair (transmitter, receiver) forming a bistatic base of said radar system, each bistatic blip $P_i$ corresponding to the echo transmitted by a receiver $Tx_j$ and received, after reflection on a target, by a receiver $E_k$ and being characterized by the transmitter $Tx_j$ having transmitted the signal of which it is the echo; said method comprising:

a preliminary step implementing the method of associating blips according to claim 1, this step making it possible to determine an n-uplet of blips likely to correspond to one and the same track;

a track initialization step proper, consisting in determining, from the parameters of the blips forming the n-uplet considered, the parameters of the corresponding target.

15. The method according to claim 14, wherein the track initialization step comprises the following substeps:

a first substep during which a first rough estimation of the position of the target is made, this first estimation being performed by implementing the gradient algorithm;

a second substep during which an exhaustive intersection calculation is made making it possible to determine, from the measurements of the bistatic distances of the blips considered and from the accuracy of these distances, as well as the positions of the receiver and of the transmitters considered, the position of the target as well as an estimation of the covariance matrix associated with that position, a third substep during which the speed of the target is calculated;

a fourth substep during which the initial covariance matrix C of the state of the target is estimated on the basis of the Cramer Rao limits determined from the accuracies of the bistatic distance, bistatic speed and azimuth measurements;

a fifth substep during which the new track is constructed by associating all the attributes which characterize it.

16. The method for initializing Cartesian tracks according to claim 14, wherein it also comprises a complementary step, prior to the preliminary step, consisting in performing a first two-dimensional association of the bistatic blips formed by the system, the analysis of the compatibility of the blips considered being performed by not taking account of the altitude of the observations corresponding to these blips, or the relative altitudes of the transmitters and of the receivers that make up the system; the bistatic blips associated during this complementary step being directly transmitted to the track initialization step, the preliminary step producing the three-dimensional association of only the blips not associated by the two-dimensional association step.

17. The method for initializing merged radar tracks, associating Cartesian tracks external to Cartesian tracks formed from the bistatic blips produced by a multistatic radar system comprising a plurality of transmitters and receivers remote from one another, one pair (transmitter, receiver) forming a bistatic base of the system, each bistatic blip $P_1$ corresponding to the echo transmitted by a receiver $Tx_j$ and received by a receiver $E_k$ and being characterized by the transmitter $Tx_j$ having transmitted the signal of which it is the echo;

wherein it associates the method for initializing Cartesian tracks according to claim 14 with a complementary association processing comprising two steps:
a first step which proceeds with the association of the external Cartesian tracks to construct merged external tracks whose attributes are functions of the attributes of external Cartesian tracks on which the merging is based;
a second step, the function of which is to try to associate free bistatic radar blips not yet associated to initialize radar Cartesian tracks, with external merged Cartesian tracks formed during the preceding step.

* * * * *